United States Patent [19]

Takemoto et al.

[11] Patent Number: 4,903,798

[45] Date of Patent: Feb. 27, 1990

[54] HYDRAULIC APPARATUS FOR AN AUTOMATIC TRANSMISSION

[75] Inventors: Haruki Takemoto, Chiryu; Takenori Kano; Fumitomo Yokoyama, both of Anjo; Mamoru Niimi, Handa; Isao Takase, Hazu, all of Japan

[73] Assignee: Aisin AW Co. Ltd., Anjo, Japan

[21] Appl. No.: 293,395

[22] Filed: Jan. 4, 1989

[30] Foreign Application Priority Data

Oct. 28, 1988 [JP] Japan .................. 63-273955

[51] Int. Cl.⁴ .................................... F01K 1/10
[52] U.S. Cl. ........................ 184/6.24; 184/6.12; 184/6.2; 74/467
[58] Field of Search .............. 184/6.12, 6.21, 6.24, 184/11.3, 6.2; 74/467

[56] References Cited

U.S. PATENT DOCUMENTS 2,995,211  8/1961  Cohen ........................ 184/6.12
3,862,672  1/1975  Tappen et al. ............... 184/6.12
4,766,773  8/1988  Yamaguchi et al. .......... 184/6.12 X Primary Examiner—Allen M. Ostrager
Attorney, Agent, or Firm—Kanesaka and Takeuchi

[57] ABSTRACT

An intake adapter is provided on an oil intake opening formed in a transaxle casing. A tightly sealed space in communication with an oil pump is provided in the lower part of the transaxle housing, formed in such a manner that it can be opened by the removal of a cover member which is secured to the transaxle casing in a freely mountable and removable manner. An oil strainer is housed in the tightly sealed space and an intake adapter is provided in communication with the tightly space and an oil sump. As a result the oil in the oil sump is taken into the intake opening of the oil strainer from the adapter, and foreign matter such as iron particles and the like is removed in a filter element and the filtered oil is supplied to an oil pump.

2 Claims, 8 Drawing Sheets

HYDRAULIC APPARATUS FOR AN AUTOMATIC TRANSMISSION

BACKGROUND OF THE INVENTION

1. Field of the Invention

The present invention relates to a hydraulic apparatus for an automatic transmission, and in particular, to the structure of an oil strainer arrangement.

2. Description of the Related Art

Conventionally, for example, in providing an oil strainer as shown in Japanese Laid Open Patent No. Sho-58-44006, a metal sheet is subjected to a stamping process to form a dish-shaped base member with a peripheral edge shoulder section and a flat wall section having a large number of supporting bosses. Mounted onto this dish-shaped base member is a filter element having a fiber mesh securely mounted to a filter frame with a plurality of ribs.

This strainer has a flat shape and is housed in an oil pan secured on the bottom of a transaxle casing. The oil in the oil pan is sucked into the oil strainer through a filter element, passes through a flow channel made up of the spaces formed from the ribs of the filter frame and the supporting bosses of the dish-shaped base member and is conducted to a discharge port.

However, in the case where an oil strainer of the above construction is positioned in an automatic transmission without an oil pan in the lower part of the device, it is not possible to ensure sufficient space to provide a supporting member and space for installing the flat strainer. The problem of intalling the strainer is created and when maintenance of the strainer are to be performed, the casing must be disassembled, so a problem is also created in the maintenance of the strainer.

Accordingly, as shown in FIG. 6 to FIG. 8, in an automatic transmission mounted in an FF (Front Engine, Front Drive) vehicle, a valve body 26 is provided on the side of the automatic transmission, a certain space 6' is formed on the lower part of a transaxle casing 13', and an intake opening 6a communicating with an oil sump 9' is provided in a circumferential wall portion in the space 6' for convenience in arranging the parts mounted on the vehicle. In addition, an oil strainer 2' is provided in the space 6', and to allow the oil strainer 2' to be removed without disassembling the casing, the space 6' is tightly sealed by the installation of a cover member 7' and communicates with the oil pump from the oil sump.

However, in the abovementioned hydraulic device, because the intake opening is directly formed in the transaxle casing, and whenever the mounting angle of the automatic transmission is changed, the position of the oil sump must also be changed, but it is not possible to freely change the position of the intake opening. As a result, it is not possible to easily accommodate the diversification of the mounting angle of the automatic transmission which has accompanied the recent trend toward many different varieties of vehicles.

SUMMARY OF THE INVENTION

An object of the present invention is to provide, with due consideration to the drawbacks of such conventional devices, a hydraulic device for an automatic transmission wherein an adapter for the intake of oil is installed facing the oil sump, and the oil intake is always maintained in the correct position, regardless of any change in the position of the oil sump.

In the present invention, for example. as shown from FIG. 1 to FIG. 4, an automatic transmission A comprising a transaxle housing (10), a transaxle casing (13), a transaxle cover (17), and a specified oil sump (9) in the bottom section of the transaxle housing (10), is characterized by a tightly sealed space (6) which communicates with an oil pump (21) in the lower section of the transaxle casing (13), a cover member (7) secured in a freely mountable and removable manner to the transaxle casing (13) and constructed so that it can be opened for the sealed space (6), and in addition, an oil strainer (2) housed in the tightly sealed space (6), and an intake adapter (1) which communicates with both the tightly sealed space (6) and the oil sump (9).

As a result of the above configuration, the oil in the oil sump (9) is taken into the intake opening (6a) of the oil strainer (2) from the intake adapter (1). Then foreign matter such as iron particles and the like is removed in a filter element (6), and the filtered oil supplied to an oil pump (21). At this time, even if the mounting angle of the automatic transmission changes and the position of the oil sump changes, by changing the intake adapter (1), the intake adapter (1) is always maintained in a suitable position with respect to the oil sump (9), and oil is supplied to the oil pump in just the right quantity. In addition, changing or routine maintenance of the oil strainer (2) can be accomplished simply by removing the cover member (7), so that troublesome actions such as dismantling of the casing become unnecessary.

The symbols are for reference only and are not restrictive with respect to the configuration of the invention.

Incidentally, the reference numerals in the parentheses are used only for reference with the drawings and do not limit the structure of the invention. The same number may be named differently in the following description and in the previous description in which broader concepts are adopted.

DETAILED DESCRIPTION OF THE PREFERRED EMBODIMENTS

The present invention will now be explained with reference to the drawings of an embodiment of the present invention.

Figure 1:
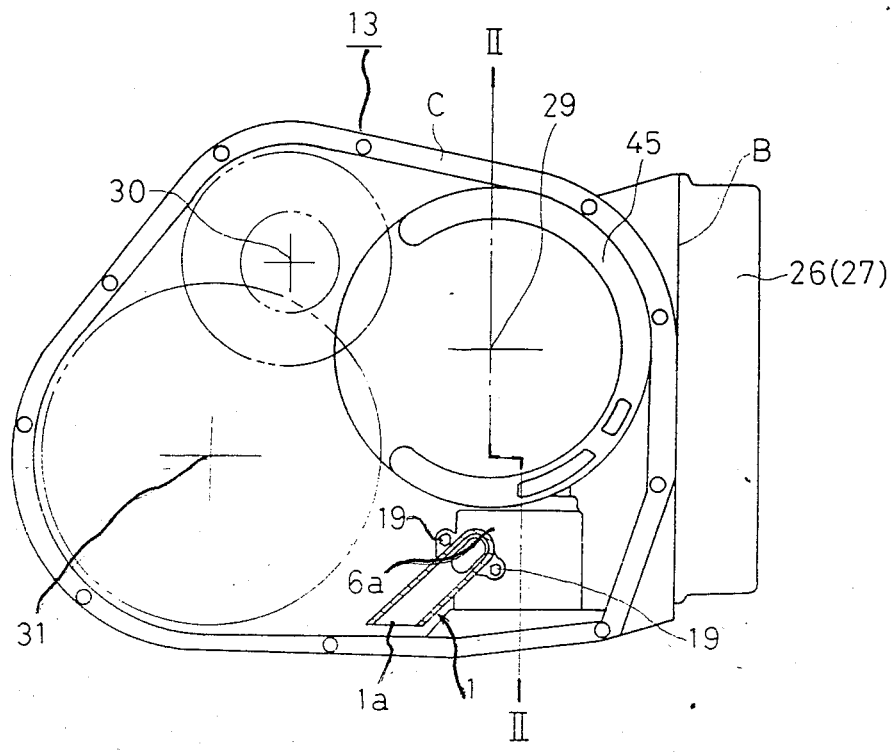
FIG. 1 is a front elevational view of a transaxle casing with the oil intake adapter of the present invention.
Figure 2:
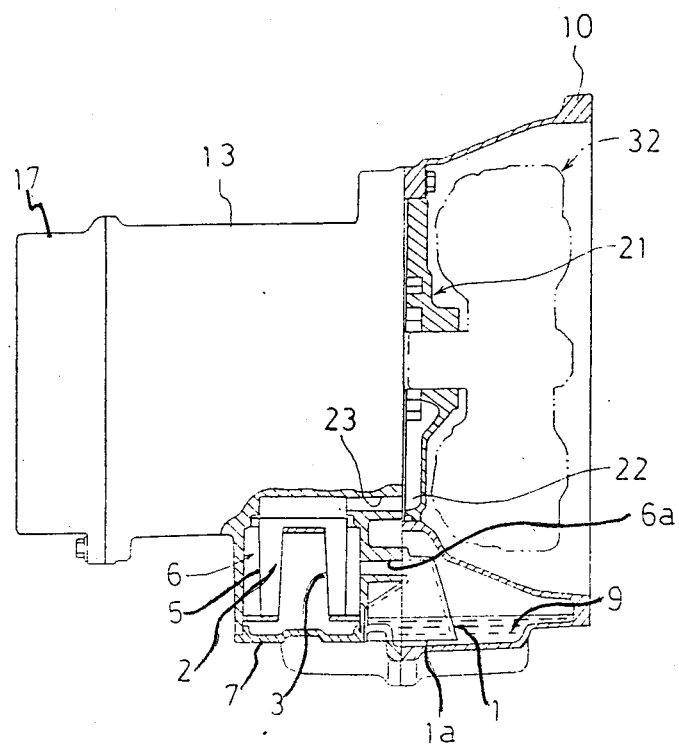
FIG. 2 is a cross-sectional view taken along the line II—II in FIG. 1.
Figure 3:
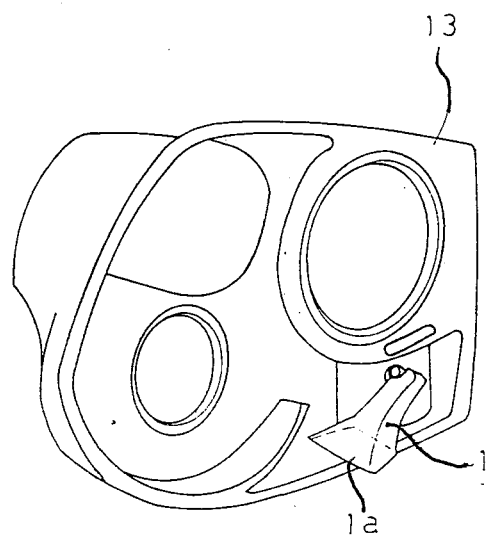
FIG. 3 is a perspective view of the transaxle casing.
Figure 5:
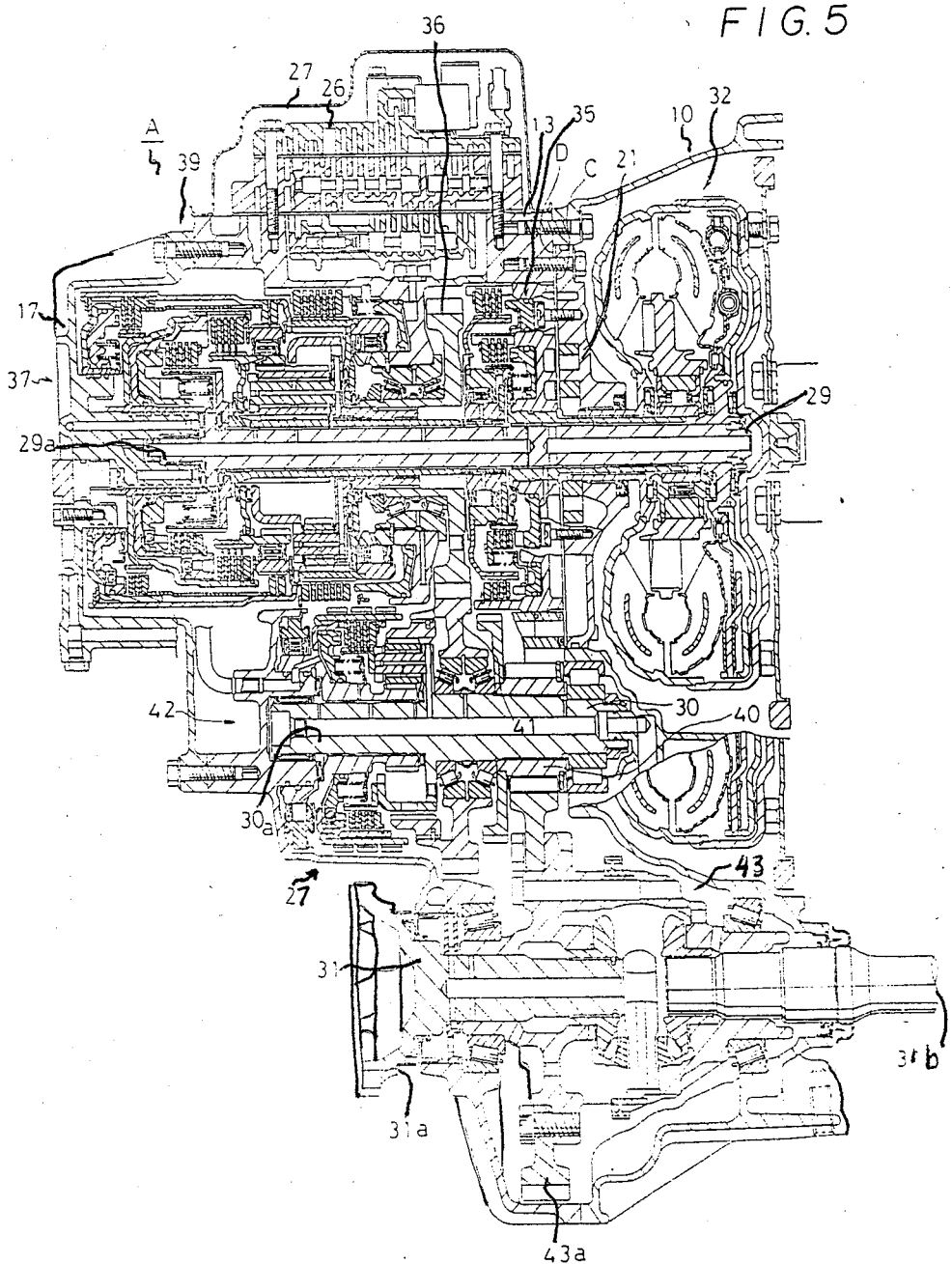
FIG. 5 is a cross-sectional view showing an automatic transmission to which the present invention is applied.
Figure 6:
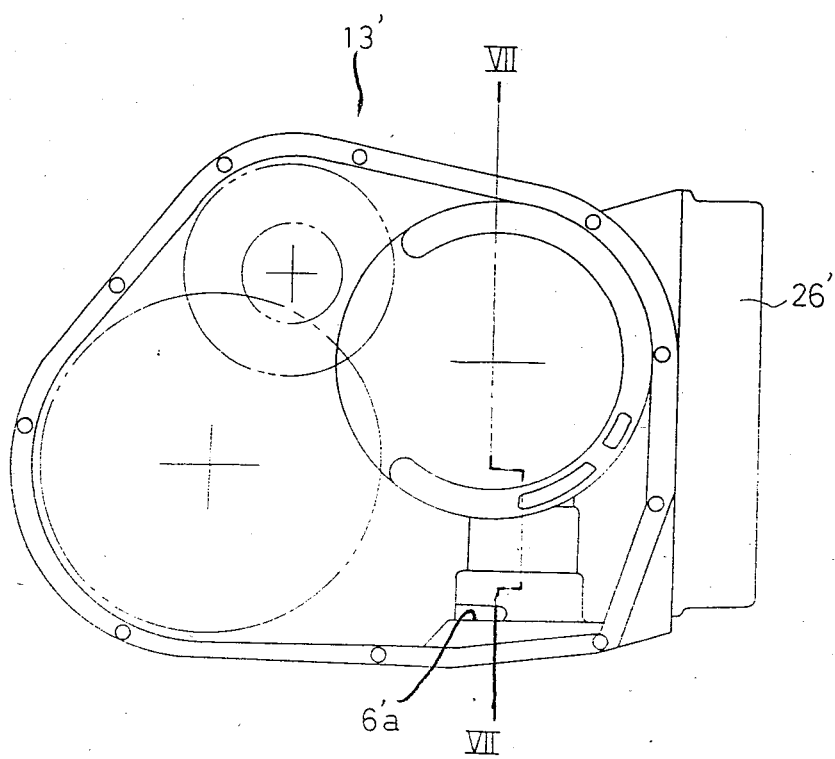
FIG. 6 is a front elevational view of a transaxle casing with an intake orifice.
Figure 7:
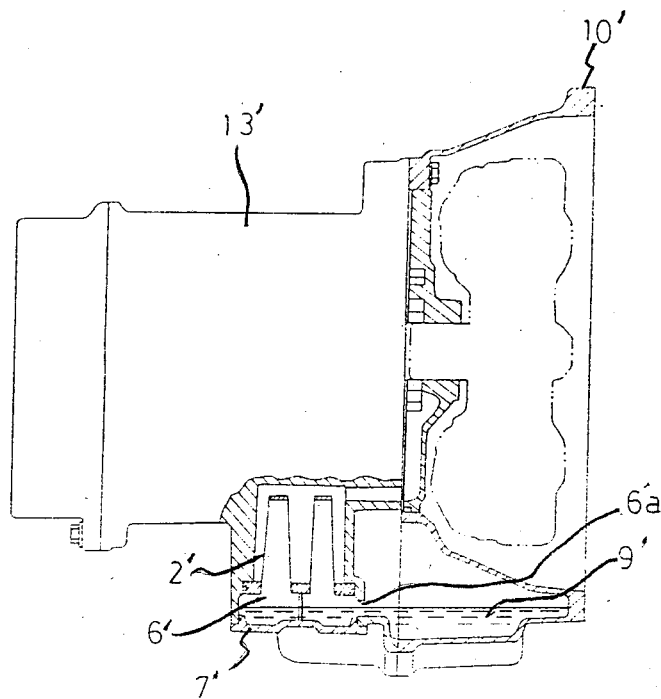
FIG. 7 is a cross-sectional view taken along the line VII—VII in FIG. 6.
Figure 8:
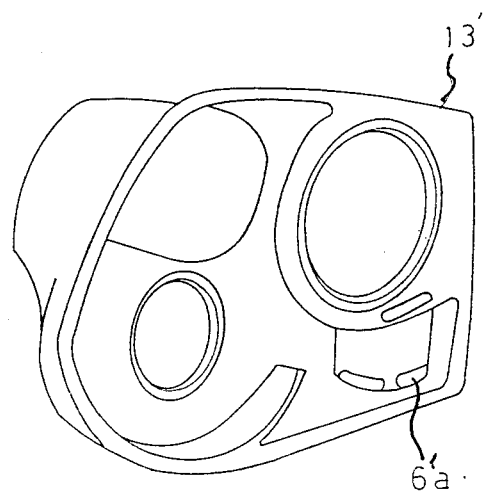
FIG. 8 is a perspective view of the transaxle casing.

Now referring to FIG. 5, an automatic transmission A comprises a transaxle housing 10, a transaxle casing 13, and a transaxle cover 17. The housing 10 and the cover 17 are secured to both sides of the casing 13 respectively to form an integrated casing. Within this integrated casing a first shaft 29 is supported concentrically with an engine crankshaft. A third shaft 31 comprising the front axle is also supported within the integrated casing, and a second shaft 30 is supported in a manner so that these three shafts come on the apex of a triangle, as shown in FIG. 1. On the first shaft 29, there are successively arranged, from the engine side, a torque converter 32, an oil pump 21, a brake section 35, a counter-drive gear 36, a forward fourth speed transmission gear mechanism 37 comprising a single and a dual planetary gear, and a clutch section 39. On the second shaft 30 there are arranged an output gear 40, a counter-driven gear 41, and an under drive mechanism section 42 which switches between the directly connected rotation and the reduced speed rotation. In addition, a front differential device 43 is arranged on the third shaft 31. A left front axle 31a and a right front axle 31b extend from the differential device 43.

Now referring to FIG. 1, the transaxle casing 13 is formed with a side surface B. A valve body 26 is secured together with the cover 27 by means of a bolt on the side surface B. A front surface C of the transaxle casing 13 forms a connecting surface linked to a rear surface D of the transaxle housing 10 as shown in FIG. 5. The housing 10 is oiltightly connected to the casing 13, and the bottom of the casing becomes an oil space 9 for storing a predetermined amount of oil.

Below the valve body 26 on the front surface C of the casing 13, specifically, below the parts housing section 48 (brake section 38) on the first shaft 29, the space 6 is integrally formed on the transaxle casing 13. The oil intake opening 6a is formed on the circumferential wall portion at a position opposed &o the junction surface D of the transaxle housing 10 of the space 6. In addition, the oil strainer 2 is housed in the space 6, and the cover member 7 is secured to the lower edge section of the strainer 2 in an oiltight and freely removable manner. The intake adapter 1 which takes in oil from the oil sump 9 through the intake opening 6a can be installed and secured by bolts 19, 19 facing to the oil sump 9.

The intake adapter 1 is provided with a wide intake port 1a for drawing in the oil, and the intake port 1a maintains a specified spacing between the bottom surface of the oil sump 9 and the intake port 1a. Also, the intake port 1a is positioned to cover the oil sump 9. In addition, the oil pump 21 is secured to the side surface C of the casing 13, by a plurality of securing bolts which are threaded into a plurality of bolt holes.

Figure 4:
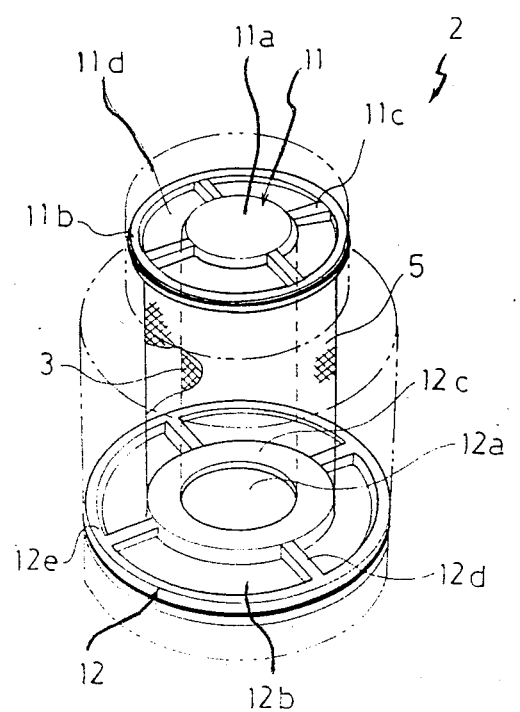
FIG. 4 is a perspective view of the oil strainer

The oil strainer 2, as shown in FIG. 4, comprises a first cylindrical filter element 3, a second filter element 5 arranged concentrically around the outside of the filter element 8, a first strainer ring 11 and a second strainer ring 12 arranged in parallel to each other and supporting the first filter element 3 and the second filter element 5 at the top and bottom axial end surfaces thereof, the second strainer ring 12 comprising an inner ring 12c and outer rings 12e and rib 12d. Mounted to the centor portion of the the inner ring 12c is an oil inlet 12a of a relatively large diameter, and a certain number of sector-shaped openings 12b are formed between the inner ring 12c and the outer ring 12e and separated by the ribs 12d. Accordingly, the lower end of the first filter element 3 is positioned along the inner periphery of the inner ring 12c, and the second filter element 5 is positioned along the outer periphery of the inner ring 12c. In addition, the first strainer ring 11 comprises a disk member 11a at its center, a ring member 11b wrapped with a peripheral sealing ring, and a plurality of ribs 11c. The top end of the first filter element 3 coincides with the circumference of the disk member 11a, and the top end of the second filter element 5 coincides with the inner circumference of the ring member 11b. Also, a certain number of sector-shaped spaces 11d are defined by the disk member 11a, the ring member 11b, and the ribs 11c, and these sector-shaped openings become the channels through which the filtered oil passes to get to the oil pump.

The oil strainer 2 when assembled is housed in the space 6 formed in the transaxle casing 13. As the result of securing the space 6 in an oil tight status with the cover 7, a tightly sealed space is formed through which oil passes from the oil sump 9 to the oil pump 21 by way of the intake adapter 1 and the oil strainer 2.

Next, the operation of the present invention will be explained.

The rotation of the engine crank shaft is transmitted to the torque converter 32 of the automatic transmission A, and then to the forward fourth speed transmission mechanism 37 from the first shaft 29. Next, the transmission mechanism 37 is suitably shifted by the suitable activation of the clutch section 39 and the brake section 35, based on the oil pressure from the valve body 26. The prescribed rotation is transmitted to the under-drive gear section 42 on the second shaft 30 through the counter-drive gear 36 and the driven gear 41. The gear section 42 is also suitably shifted based on the oil pressure from the valve body 26 in the same way as the gear section 37, and the rotation is transmitted to the second shaft 30 and the output gear 40. The rotation of the output gear 40 is transmitted to the front differential device 43 through the ring gear 43a, then transmitted to the left and right front wheels from the left and right front axle shaft 31a, 31b. In addition to the operating oil supplied to the clutch section and the brake section, from the valve body 26, oil is supplied for lubrication to each lubrication position through a pair of oiling holes 29a, 30a, and the like, in the first shaft 29 and the second shaft 30 respectively.

The drain oil from the respective hydraulic servos for the clutch section 39 and the brake section 35 is discharged from the valve body 26 into the oil channel of the casing 13. This oil is directly sucked into the suction port 22 of the oil pump 21. In addition, the oil used for lubrication is accumulated in the oil space 9. The oil in the oil sapce, as opposed to the operating oil from the valve body 26 which is comparatively clean, contains burrs and the like from the gears and the like and therefore contains a large amount of foreign matter. Then, the shortage of oil sucked in from the valve body 26 directly to the oil pump 21 is made up from the oil space 9 through the suction adapter 1, the suction port 6a, the oil inlet 12a of the second oil strainer 12 and the sector space 12b. From the oil passing through the oil inlet 12a, the foreign material is removed by the first filter element 13, and from the oil passing through the sector space 12b, the foreign material is removed by the second filter element 5. The oil from which the foreign material is removed by the filter elements is introduced in a space between the first and second filter elements 3 and 5, a sector space 11d of the first strainer ring 11, and through the oil channel 23, in the suction port 22 of the oil pump 21. The oil in the oil space 9 is sufficiently and adequately sucked and sent to the oil strainer 2 because the suction adapter 1 is placed always in the suitable position with reference to the oil surface.

The foreign material trapped in the first and second filter elements 3 and 5 in the oil strainer 2 is dropped down through the oil and accumulated in the cover member 7. Accordingly the cover member 7 is easily removed from the oil strainer 2 to process the accumulated foreign material.

TECHNICAL ADVANTAGES OF THE INVENTION

As outlined in the above explanation, by means of the present invention, corresponding to a change in the oil surface caused by the mounting angle of the automatic transmission (A), the position of the intake opening (1a) of the intake adapter (1) with respect to the oil surface of the oil sump (9) can be mounted to always take in the proper amount of oil, so that although the intake adapter (1) is simply constructed, its application to a wide range of utilization objectives is enhances, and its cost can be reduced. In addition, a precise amount of oil is always supplied to the oil pump (21).

In addition, because the oil strainer (2) can be taken out by removal of the cover (7), it is unnecessary to disassemble the transaxle housing (10) and transaxle casing (13), and the maintenance and operation of the strainer (2) is improved.

What is claimed is:

1. A hydraulic device for an automatic transmission comprising a transaxle housing, a transaxle casing, a transaxle cover, and an oil sump formed in the bottom of the transaxle housing wherein the improvement comprises a tightly sealed space formed in the lower part of the transaxle housing and placed in communication with an oil pump in such a manner that it can be opened by the removal of a cover member which is secured to the transaxle casing in a freely mountable and removable manner;

an oil strainer housed in the tightly sealed space; and an intake adapter provided for communication between the tightly sealed space and the oil sump.

2. A hydraulic device for an automatic transmission of claim 1 wherein:

the automatic transmission comprises a first shaft positioned concentrically with the engine crank shaft: a third shaft which serves as the front axle; and a second shaft such that the first, second and third shafts are positioned on the apex of a triangle;

a torque converter and a fourth speed transmission device comprising forward fourth speed and reverse first speed are arranged on the first shaft;

an under-drive mechanism is positioned on the second shaft for stitching a direct and reduced speed rotation;

a differential device is positioned on the third shaft; and a valve body is positioned on the side surface of the transaxle casing.

* * * * *